Sept. 5, 1950 M. DRESSLER 2,521,454
AERATION UNIT AND SUPPORT THEREFOR
Filed Aug. 17, 1945
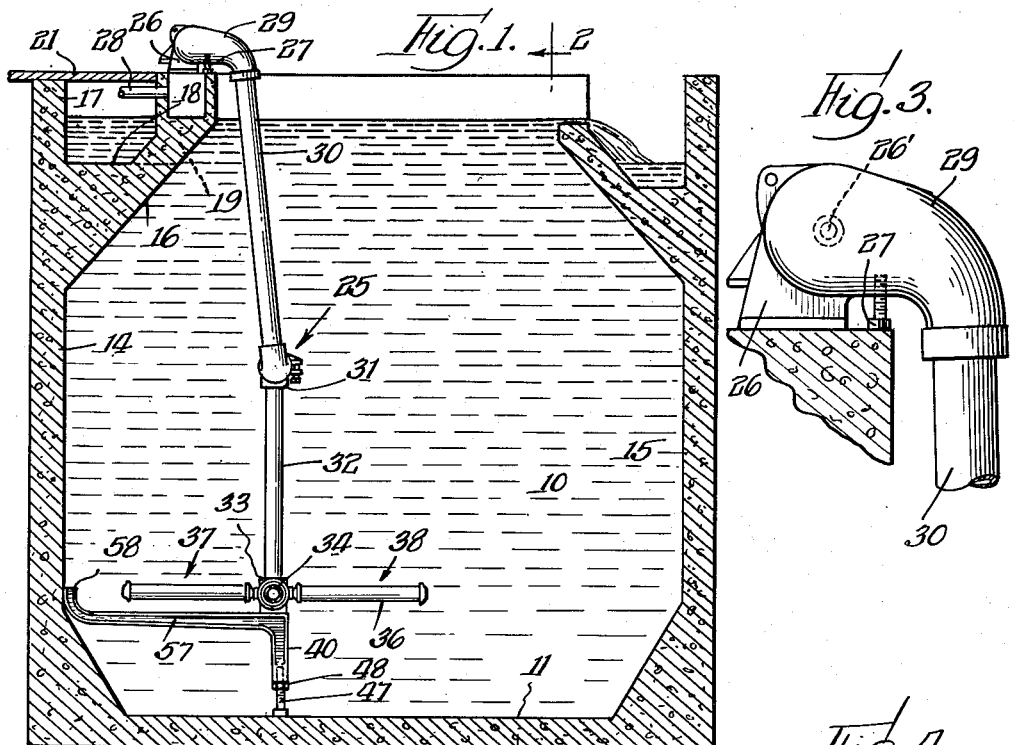
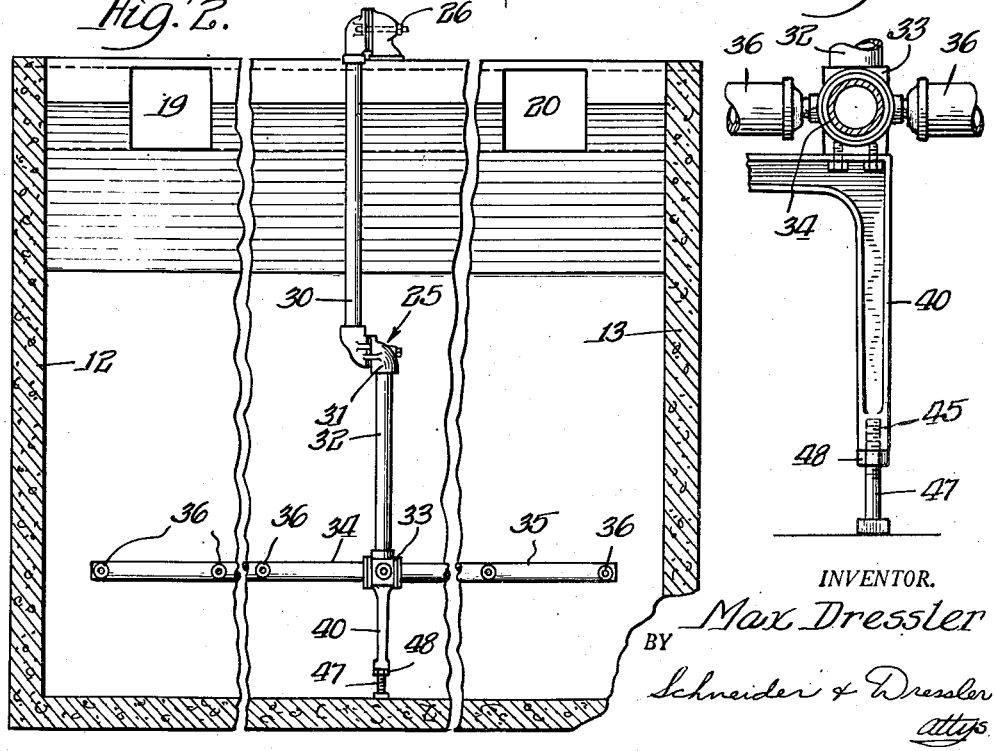
INVENTOR.
Max Dressler
BY
Schneider & Dressler
attys Patented Sept. 5, 1950

2,521,454

UNITED STATES PATENT OFFICE 2,521,454

AERATION UNIT AND SUPPORT THEREFOR

Max Dressler, Chicago, Ill., assignor to Chicago Pump Company, a corporation of Delaware Application August 17, 1945, Serial No. 610,914

1 Claim. (Cl. 261—124)

This invention relates to liquid aeration systems and particularly to those systems having aeration tanks provided with articulated diffuser units. More particularly, the invention relates to sewage systems employing that type of articulated diffuser unit having pivot joints normally disposed under operating conditions below the liquid level of sewage in aeration tanks and/or channels leading to the tank.

A complete diffuser unit of the above type generally comprises a hollow anchoring structure to which may be pivotally mounted the diffuser unit proper. The diffuser unit proper may be as disclosed in Patent 2,328,655 to Lannert. Thus it may consist of two or more pipe lengths jointedly connected to jack-knife in the "up" position of the unit. In the "down" position of the unit, which is the normal operating position, the pipe lengths are generally extended and, at the end of the pipe system, there is a diffuser assembly. Each such assembly has one or more manifolds from which extend diffuser elements generally transversely therefrom, the diffuser elements being as long and as numerous as conditions require.

While the entire pipe system and manifolds are customarily made of mechanically strong material, such as iron or steel, the air diffuser elements themselves are generally made of ceramic or similar material having substantially less mechanical strength than iron or steel. As is well known, such diffuser elements are generally provided with a large number of minute apertures through which air or other aeriform body is diffused into the liquid mass of sewage or other material being treated.

In the normal operation of an air diffuser system, particularly one used for treating sewage, the creation of well-defined sewage currents within the tank is desirable. As a rule, substantial turbulence is created and the sewage flow occurs at a substantial rate. Because of the existence of such turbulent conditions, it is found that considerable stresses are created over the entire diffuser unit.

It is clear from the general construction of a diffuser unit that the center of gravity of the entire system under normal operation is quite low. The greater the number of diffuser elements carried by the manifold, the lower is the center of gravity of the entire diffuser unit.

A diffuser unit having a low center of gravity and extending into a turbulent liquid will have substantial stresses and strains on the various portions of the unit. The elasticity of the metal pipes supporting the manifold and diffuser elements, together with the relatively large exposed surface of the manifolds and diffuser elements, results in movement of the entire diffuser unit. Such movement generates strains at the various joints of the entire diffuser system. In the prior art, the joint at the stanchion carrying the entire articulated diffuser unit has had great strains created therein. The low center of gravity of the entire diffuser unit and the existence of substantial forces at the bottom end thereof generally results in constant action at the joints, particularly at the stanchion joint, and in the ultimate loss of air at the joints. Due to this loss of air the efficiency of the entire unit is seriously impaired. In addition the leakage of air at the strained joints may interfere with the creation and maintenance of well-defined liquid currents in the sewage tank and thus may deleteriously affect sewage treatment.

A further undesirable result of such whipping and stresses is the breakage of diffuser elements. In an attempt to avoid the above undesirable characteristics, it has been the general practice to have a comparatively small number of diffuser elements for each diffuser assembly to minimize the effects of the reactive and turbulent forces existing around the diffuser assembly. And the stiffness of the depending pipes has been relied upon to maintain the diffuser elements more or less rigidly in position.

It is clear that the cost of an installation for sewage treatment involves as an important element the number of diffuser units. By virtue of the invention herein, it is possible to provide fewer but larger diffuser units. The invention herein provides means for stabilizing a diffuser unit against whipping or strain incident to normal diffusion operation. The invention in general provides means for suppressing movement of manifolds during the normal operation of a diffuser assembly, thereby almost completely eliminating whipping. This permits the use of large diffuser assemblies and also provides great flexibility with regard to the amount of turbulence that can be tolerated in a treating tank.

In accordance with the invention herein, the depending supply pipe under normal operating conditions merely serves to supply air and no longer has any primary mechanical functions of supporting and stiffening the diffuser assembly. It is thus possible to design the supply pipe with scant regard for the stresses that would normally have to be considered.

Referring to the drawings:

Figure 1 is a sectional elevation of an aeration tank system embodying the invention. Figure 2 is a vertical transverse section of the system of Figure 1, taken along the line 2—2 of Figure 1. Figure 3 is a detail of the elbow. Figure 4 is a detail of the diffuser support structure.

In the drawings, tank 10 of concrete or other suitable material has bottom 11, end walls 12 and 13 and side walls 14 and 15. One of the walls, here shown as side wall 14, has an overhanging ledge 16 in the general form of a half Y. Top portion 17 of wall 14 is channeled at 18, this being an influent sewage channel having end ports 19 and 20 giving access to the tank proper. Channel 18 is covered with plate 21 to form a catwalk along the tank. Disposed within the tank is shown an air diffusing unit generally indicated by numeral 25. This unit, except for the length of header and number of diffuser assemblies, is generally described in the above patent to Lannert.

Diffuser unit 25 includes hollow stanchion 26 suitably anchored in the top of over-hanging ledge 16. This stanchion may be supplied with compressed air from pipe 28 extending along the upper portion of channel 18. Pivotally secured to stanchion 26, on a pivot pin 26', is fitting 29 in the general form of an elbow. Elbow 29 carries adjustable stop bolt 27 normally engaging the tank top to support the elbow in normal operation position and take some of the load from the stanchion joint. This elbow is hollow and communicates with the interior of stanchion 26. Elbow 29 has a tapped end into which pipe 30 may be threaded. Pipe 30 may be of any suitable material such as iron or steel and, at the end, is threaded into pivot joint 31. Both elbow fitting 29 and pivot joint 31 are so disposed that pivotal movement in vertical planes normal to tank wall 14 is provided. Joint 31 may have the relatively movable portions provided with bosses and a stop bolt to limit joint movement, as in the Lannert patent.

Pivot joint 31 carries pipe section 32 provided with fitting 33 at the end thereof. Fitting 33 may resemble the conventional T fitting and carries manifolds 34 and 35 at opposite sides thereof. As is clearly evident from Figure 2, manifolds 34 and 35 normally extend transversely from the end of pipe 32 and are generally disposed parallel to the tank bottom and side 14. Manifolds 34 and 35 carry a number of diffuser elements 36 threaded in or otherwise secured thereto. The diffuser elements may be of ceramic or iron or any other desired material provided with a number of minute apertures through the wall through which air may diffuse. The diffuser elements preferably extend transversely of manifolds 34 and 35 and parallel to the tank bottom. One series 37 of diffuser elements may extend toward tank wall 14, while the remaining series 38 may extend away from tank wall 14.

To support the diffuser assembly under normal operating conditions, leg 40 forming part of the diffuser assembly is provided, suitably at fitting 33. Additional legs may be provided, as desired. Leg 40 may be attached to or formed integral with fitting 33. Leg 40 may have any desired shape and may simply consist of a pipe extending downwardly from the diffuser assembly toward bottom 11 of the tank in normal operating position.

Leg 40 has the lower end 45 tapped. Threaded into tapped end 45 is adjusting bolt 47. The effective supporting height of leg 40 may be adjusted by turning bolt 47 and lock nut 48 is provided to retain bolt 47 fixed.

It is preferred to adjust leg 40 so that the entire diffuser assembly is supported under normal operating conditions in the manner shown in Figure 1, namely with top pipe 30 inclined somewhat from the vertical. Thus, a knee-action at joint 31 is provided and this tends to reduce the stress and tension in the pipe sections and joints. The diffuser assembly consisting of manifolds and diffuser elements is permitted to adjust itself to leg 40 and is not constrained in any way by the supply pipe system. Bolt 27 supports the elbow and takes the load from stanchion pivot pin 26'. This bolt is adjusted when the diffuser unit is in operating position to accomplish this.

This entire construction provides support at both ends of the articulated diffuser unit and is particularly desirable in that no great stresses are impressed upon any pivot joints. While temporary strains may be impressed upon pivot joints during raising or lowering of the entire unit, such strains are quickly relieved. In the absence of the supports, strains on the pivot joints have tended to damage them. A further desirable advantage of the relaxed condition of the pivot joints is that there is no opportunity for grit to work into the machined joint surfaces and gradually destroy them.

One or more stops 57 may be carried by fitting 33 and manifolds 34 and 35. Stop 57 may be integral with leg 40 and form an angular structure which may be attached as a unit where supporting legs are desired. It is understood that, in some instances, it may be desirable to have a supporting leg minus the stop. The stop itself may be of pipe or solid steel rod and is preferably provided with an upwardly curved tip 58.

The entire diffuser unit may be raised out from or lowered into the tank by exerting suitable force upon elbow 29, as by a cable engaging the crook of the elbow. It is preferred to have pipe 32 somewhat shorter than pipe 30 so that, when the unit is raised above the tank, the diffuser assembly will clear the top of the tank. This is shown in Figure 1 of the Lannert patent previously mentioned. In lowering the unit into the tank, the diffuser assembly will tend to swing toward wall 14. This is evident from the proportions, mounting and disposition of the component parts of each diffuser unit. When the unit is in normal operating position, elbow 29 will be supported on bolt 27, as described above.

It is evident from the above that manifolds 34 and 35 may be as long as desired and may have as many diffuser elements extending therefrom as may be deemed necessary. If desired, auxiliary means acting on the manifolds may be provided for aiding in raising or lowering the same so that pipes 30 and 32 will not bear the entire weight of manifolds and diffuser elements during such operations. A substantial portion of the weight of the entire diffuser unit may be neutralized by keeping air at a low pressure in the unit during the raising or lowering. Thus, by having just enough air pressure to prevent any liquid from entering any part of the diffuser unit, but not enough to create any substantial turbulence, it is possible to take advantage of the buoyancy of the contained air in supporting the weight of the manifolds and diffuser elements during the raising or lowering thereof.

While the diffuser unit has been described with particular reference to its use in a sewage treating tank, it is not limited to such use, for it may be used in tanks for aerating or gasifying any desired liquid. In the latter use any suitable gas or gasiform may be used in lieu of air. Because of the supporting means of the present invention, the diffuser assembly may be made larger than heretofore, thereby making commercially feasible the use of air diffusion units in long channels, such as in the channel between the primary settling tank and the aeration tank in a sewage treating system.

I claim:

In an aeration type of sewage treating apparatus, a sewage tank having a side wall and a bottom wall, a hollow stanchion anchored in said tank at said side wall, an articulated diffuser unit having an element jointedly connected to said stanchion, stop means carried by said element for contacting the top of said side wall and thereby limiting the movement of said element and preventing contact thereof with said side wall, said articulated diffuser unit including a pair of jointedly connected pipes and a diffuser assembly carried thereby, said stanchion and pipes being hollow for supplying air to said diffuser assembly, a rigid leg also carried by said pipes, said leg being adapted to contact the tank bottom in the normal operating position of said diffuser unit and said stop being adapted to support said element when said diffuser unit is in said normal operating position, said leg, stop and articulated diffuser unit being so proportioned that said pipes and joints are supported between said stanchion and tank bottom substantially free from strains.

MAX DRESSLER.

REFERENCES CITED

The following references are of record in the file of this patent:

UNITED STATES PATENTS

| Number | Name | Date |
| --- | --- | --- |
| 2,144,385 | Nordell | Jan. 17, 1939 |
| 2,221,346 | Durdin, Jr. | Nov. 12, 1940 |
| 2,328,655 | Lannert | Sept. 7, 1943 |